United States Patent
Nammi et al.

(10) Patent No.: US 10,992,339 B2
(45) Date of Patent: *Apr. 27, 2021

(54) UPLINK COVERAGE FOR 5G OR OTHER NEXT GENERATION NETWORK USING MULTI-SLOT FREQUENCY HOPPING

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,415

(22) Filed: Jan. 2, 2020

(65) Prior Publication Data

US 2020/0195299 A1    Jun. 18, 2020

Related U.S. Application Data

(63) Continuation of application No. 15/870,641, filed on Jan. 12, 2018, now Pat. No. 10,547,347.

(51) Int. Cl.
*H04B 1/7136* (2011.01)
*H04L 1/18* (2006.01)
(Continued)

(52) U.S. Cl.
CPC ......... *H04B 1/7136* (2013.01); *H04B 1/7143* (2013.01); *H04B 7/02* (2013.01);
(Continued)

(58) Field of Classification Search
CPC ...... H04B 1/7136; H04B 1/7143; H04B 7/02; H04B 7/0834; H04B 7/18547;
(Continued)

(56) References Cited

U.S. PATENT DOCUMENTS 6,275,518 B1   8/2001   Takahashi et al.
7,327,715 B2 *  2/2008   Baker ................. H04W 52/221
                                                      370/349
(Continued)

FOREIGN PATENT DOCUMENTS

WO          97/01889 A2    1/1997
WO       2017/222433 A1   12/2017

OTHER PUBLICATIONS

"Uplink Control Channel Format 2", https://www.mathworks.com/help/lte/ug/uplink-control-channel-format-2.html. Last accessed on Apr. 3, 2018. 7 pages.

(Continued)

*Primary Examiner* — Michael R Neff
(74) *Attorney, Agent, or Firm* — Amin, Turocy & Watson, LLP

(57) ABSTRACT

Facilitating multi-slot frequency hopping can comprise generating configuration data associated with configuring a mobile device with a multi-slot operation, associated with slots of the mobile device, for sending uplink channel control data or traffic channel data. Additionally, facilitating multi-slot frequency hopping can comprise transmitting the configuration data to the mobile device, resulting in a multi-slot configuration of the mobile device, wherein the configuration data comprises hopping patterns to be used by the slots.

20 Claims, 12 Drawing Sheets

(51) Int. Cl.
*H04B 1/7143* (2011.01)
*H04B 7/02* (2018.01)
*H04B 7/08* (2006.01)
*H04B 7/185* (2006.01)
*H04B 7/26* (2006.01)

(52) U.S. Cl.
CPC ....... *H04B 7/0834* (2013.01); *H04B 7/18547* (2013.01); *H04L 1/1858* (2013.01); *H04L 1/1864* (2013.01); *H04L 1/1896* (2013.01); *H04B 7/2615* (2013.01)

(58) Field of Classification Search
CPC ... H04B 7/2615; H04L 1/1858; H04L 1/1864; H04L 1/1896
USPC .......................................................... 375/135
See application file for complete search history.

(56) References Cited

U.S. PATENT DOCUMENTS

| | | | |
|---|---|---|---|
| 9,496,919 B2 | 11/2016 | Rikkinen et al. | |
| 9,590,693 B2 | 3/2017 | Ahn et al. | |
| 9,667,386 B2 | 5/2017 | Li et al. | |
| 9,674,871 B2 | 6/2017 | Lee et al. | |
| 9,826,490 B2 | 11/2017 | Cai et al. | |
| 9,838,102 B2 | 12/2017 | Xiao et al. | |
| 10,547,347 B2 * | 1/2020 | Nammi | H04L 1/1858 |
| 2008/0095109 A1 | 4/2008 | Malladi et al. | |
| 2010/0110994 A1 | 5/2010 | Ratsuk et al. | |
| 2012/0300740 A1 * | 11/2012 | Iwai | H04J 13/0062 370/329 |
| 2013/0242902 A1 | 9/2013 | Liu et al. | |
| 2016/0081101 A1 * | 3/2016 | Yu | H04W 84/12 370/329 |
| 2016/0127936 A1 | 5/2016 | Chatterjee et al. | |
| 2016/0174194 A1 | 6/2016 | Suzuki et al. | |
| 2016/0337103 A1 | 11/2016 | Kim et al. | |
| 2017/0149480 A1 | 5/2017 | Kakishima et al. | |
| 2017/0367046 A1 | 12/2017 | Papasakellariou | |
| 2018/0295651 A1 | 10/2018 | Cao et al. | |
| 2018/0324777 A1 | 11/2018 | Wang et al. | |
| 2019/0052421 A1 | 2/2019 | Yin et al. | |
| 2019/0081763 A1 | 3/2019 | Akkarakaran et al. | |

OTHER PUBLICATIONS

Non-Final Office Action received for U.S. Appl. No. 15/870,641 dated May 9, 2019, 33 pages.
International Search Report and Written Opinion received for PCT Application Serial No. PCT/US2018/065797 dated Jun. 18, 2019, 23 pages.
AT&T, "On Frequency hopping of long PUCCH Over Multiple Slots", URL: http://www.3gpp.org/ftp/tsg%5Fran/WG1%5FRL1/TSGR1%5F91/Docs/, 3GPP TSG RAN WG1 Meeting#91, R1-1719646, Nov. 27-Dec. 1, 2017, pp. 1-6.
Vivo, "Design of long-PUCCH over multiple slots", URL:http://www.3gpp.org/ftp/tsg_ran/WG1_RL1/TSGR1_90b/Docs/, 3GPP TSG RAN WG1 Meeting #90bis, R1-1717494, Oct. 9-13, 2017, 4 pages.
AT&T, "On long PUCCH over multiple slots", URL: http://www.3gpp.org/ftp/Meetings_3GPP_SYNC/RAN1/Docs/, 3GPP TSG RAN WG1 #90bis, R1-1718399, Aug. 21-25, 2017, 5 pages.
Huawei, "Text proposal an HARQ process design for the EUL repetition solutions", URL: http://www.3gpp.org/ftp/tsg_ran/WG1_RL1/TSGR1_81/Docs/, 3GPP TSG RAN WG1 Meeting #81, May 25-29, 2015, pp. 1-2.
International Preliminary Report on Patentability received for PCT Application Serial No. PCT/US2018/065797 dated Jul. 23, 2020, 13 pages.

* cited by examiner

UPLINK COVERAGE FOR 5G OR OTHER NEXT GENERATION NETWORK USING MULTI-SLOT FREQUENCY HOPPING

RELATED APPLICATION

The subject patent application is a continuation of, and claims priority to, U.S. patent application Ser. No. 15/870,641, filed Jan. 12, 2018, and entitled "IMPROVING UPLINK COVERAGE FOR 5G OR OTHER NEXT GENERATION NETWORK USING MULTI-SLOT FREQUENCY HOPPING," the entirety of which application is hereby incorporated by reference herein.

TECHNICAL FIELD

This disclosure relates generally to wireless communication systems. For example, this disclosure relates to improving the performance of uplink control channels for a 5G, or other next generation network.

BACKGROUND

5th generation (5G) wireless systems represent a next major phase of mobile telecommunications standards beyond the current telecommunications standards of 4th generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to improving the performance of uplink control channels is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
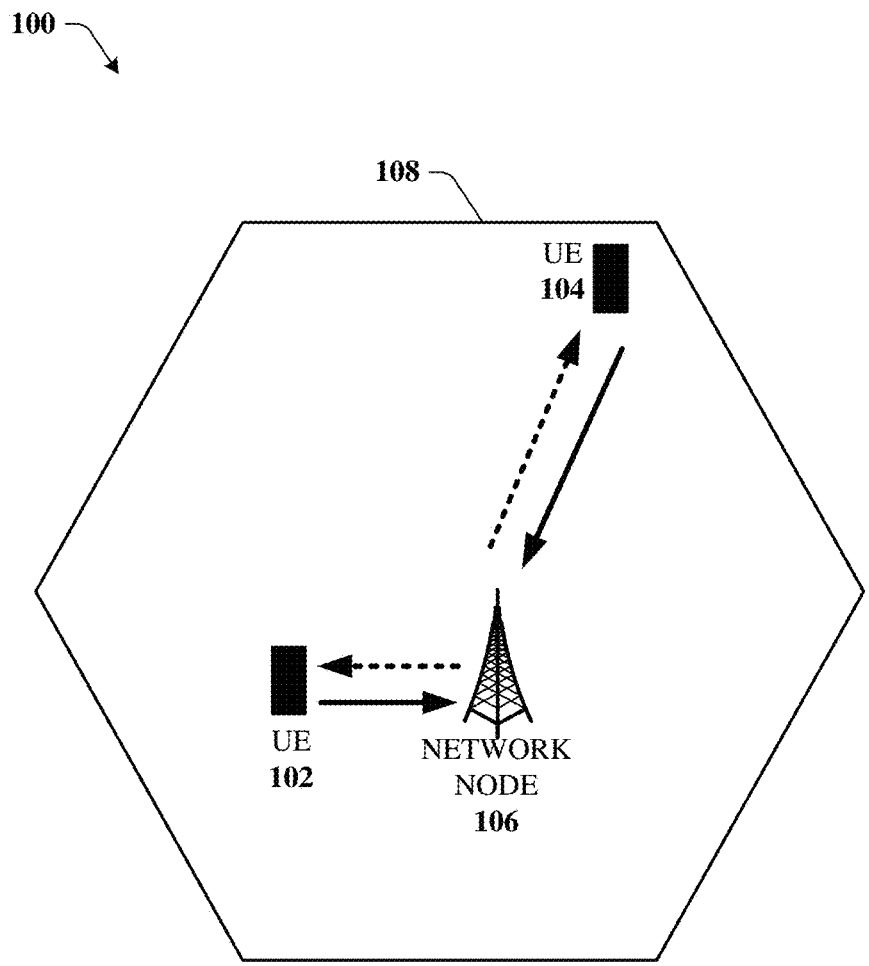
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate multi-slot frequency hopping for a 5G or other next generation network. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate multi-slot frequency hopping for a 5G network. Facilitating multi-slot frequency hopping for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

To improve the coverage of a physical uplink control channel (PUCCH) the network can configure a UE with multi-slot operations. Frequency hopping provides additional frequency diversity gains. However, when the network configures a UE with frequency hopping in combination with multi-slot operation, a full diversity gain may not be obtained. This is because in conventional systems the hopping is done at the slot level (e.g., in multi-slot operation, each slot has the same frequency hopping pattern as that of the first slot). Thus, over all the multi-slots, the frequency diversity gain can be equal to that of the first slot. This reduces the coverage for NR. Hence, an efficient solution to obtain diversity gains when the UE is configured with multi-slot operation in NR is sought.

The frequency diversity gain in NR can be achieved when the UE is configured with multi-slot operations by indicating the different frequency hopping pattern for each slot. Note that this includes a case of no hopping for some slots to increase the diversity gain. This disclosure comprises embodiments that can be implemented in the network node and/or in the UE. For example, the network node can identify or obtain location and/or position data associated with the UE. The network node can also determine a Doppler metric value and/or a signal-to-noise ratio associated with a channel used for communication between the UE and the network node. Based on the previous data, the network node can determine the multi-slot configuration and the frequency hopping pattern for the slots. Consequently, the network node can generate and communicate a recommendation associated with the frequency hopping pattern to the UE.

Furthermore, the UE can use the recommendation data to then transmit data to the network node. After the UE receives the recommendation from the network node, the UE can determine the hybrid automatic repeat request acknowledgement (HARQ-ACK) and CSI based on the recommendation received from the network node. The HARQ-ACK repetition factor (e.g., N_acknack_transmit) describes how many times the UE should transmit the (same) HARQ-ACK message associated with a transport block. In other words, the HARQ-ACK transmission can be repeated a total of N_acknack_transmit-1 times. The supported values are {1, 2, 3, and 4} and it can be configured by the network via RRC. Thereafter, the UE can apply the recommended multi-slot configuration and the frequency hopping pattern for the slots and transmit data to the network node via the PUCCH.

The proposed solution allows for the multi-slot operation with different frequency hopping patterns for the slots, thereby achieving the diversity gain on top of a power gain. This, in turn, improves the NR coverage, which allows for a robust performance of the UL control channel even at low signal interference to noise ration (SINR) conditions. This allows the 5G system to operate in higher frequency bands while matching the coverage of legacy systems such as 4G LTE in lower frequency bands. It should be understood that the solutions proposed in this disclosure are applicable to both downlink, uplink, and side link data transmissions even though the example of UL transmissions are discussed as a primary use case. In addition, the embodiments are applicable to single carrier and multi-carrier (e.g., carrier aggregation) transmissions.

This disclosure discusses signaling of different frequency hopping patterns for different slots, when the UE is configured with multiple slots, to transmit the uplink control information (e.g., HARQ-ACK, CSI, etc.) The network and the UE can pre-define frequency hopping configurations a priori. Thus, the UE can be configured with multiple slots based on the path loss of the UE or the location of the UE (e.g., if the path loss is greater than a defined threshold, or if the UE is at a cell edge). The network node can send information about the multi-slot configuration (e.g., how many times the UE needs to repeat the information, resource data, the frequency hopping pattern, the no hopping pattern, etc.) to the UE. The network node can convey this information to the UE via radio resource control (RRC) signaling. Alternatively, the network node can convey this information to the UE via an L1 signaling, such as a downlink control channel.

In another embodiment, the network can determine the Doppler metric of the UE and determine if the UE speed is greater than a defined threshold (e.g., if the UE is moving with a high Doppler, then use the same frequency hopping pattern for each slot). For UEs moving at a high speed, the frequency diversity gain is already obtained as part of the channel because the channel quickly changes. However, if the UE is moving at a slow rate of speed, the frequency hopping pattern for each slot option provides better frequency diversity. There are several techniques to obtain the Doppler frequency of the UE. For example, a direct speed measurement can be computed by the network node by accessing a global position system at multiple intervals. The Doppler metric can then be taken as an average of the speed measurements at the multiple positions. The rate of change of the uplink channel can also be used to estimate the Doppler metric because the rate of change of the uplink channel provides the Doppler metric. Alternatively, the rate of change of a downlink channel quality can be used to determine the Doppler metric. Thus, the network node can assign a hopping pattern based on the Doppler metric. For example, if the CQI is reported by the UE at any given time interval and $\Delta$CQI represents the rate of change of CQI over K, then the Doppler metric can be computed as:

$$Dm=\Delta CQI/\Delta T \quad \text{Equation (1):}$$

In one embodiment, a system can facilitate, generating configuration data associated with configuring a mobile device with a multi-slot operation, associated with slots of the mobile device, for sending uplink channel control data or traffic channel data. The system can also transmit the configuration data to the mobile device, resulting in a multi-slot configuration of the mobile device, wherein the configuration data comprises hopping patterns to be used by the slots.

According to another embodiment, described herein is a machine-readable storage medium that can perform the operations comprising receiving location data associated with a location of a mobile device, of a wireless network, in relation to a network device of the wireless network. Based on the location of the mobile device, the machine-readable storage medium can generate configuration data associated with configuring the mobile device with a multi-slot operation, associated with slots of the mobile device, for sending uplink channel control data and control channel data. Additionally, the machine-readable storage medium can transmit the configuration data to the mobile device, resulting in a multi-slot configuration of the mobile device, wherein the configuration data comprises hopping patterns to be used by the slots.

In yet another embodiment, described herein is a method comprising receiving, by a mobile device comprising a processor, a recommendation of a slot configuration for the mobile device applicable to the slot based on slot configuration data, associated with a slot of a channel, generated by a wireless network device of a wireless network. Based on the recommendation, the method can comprise determining, by the mobile device, a hybrid automatic repeat request to be sent to the wireless network device. The method can also transmit, by the mobile device, uplink channel control data in accordance with recommendation.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
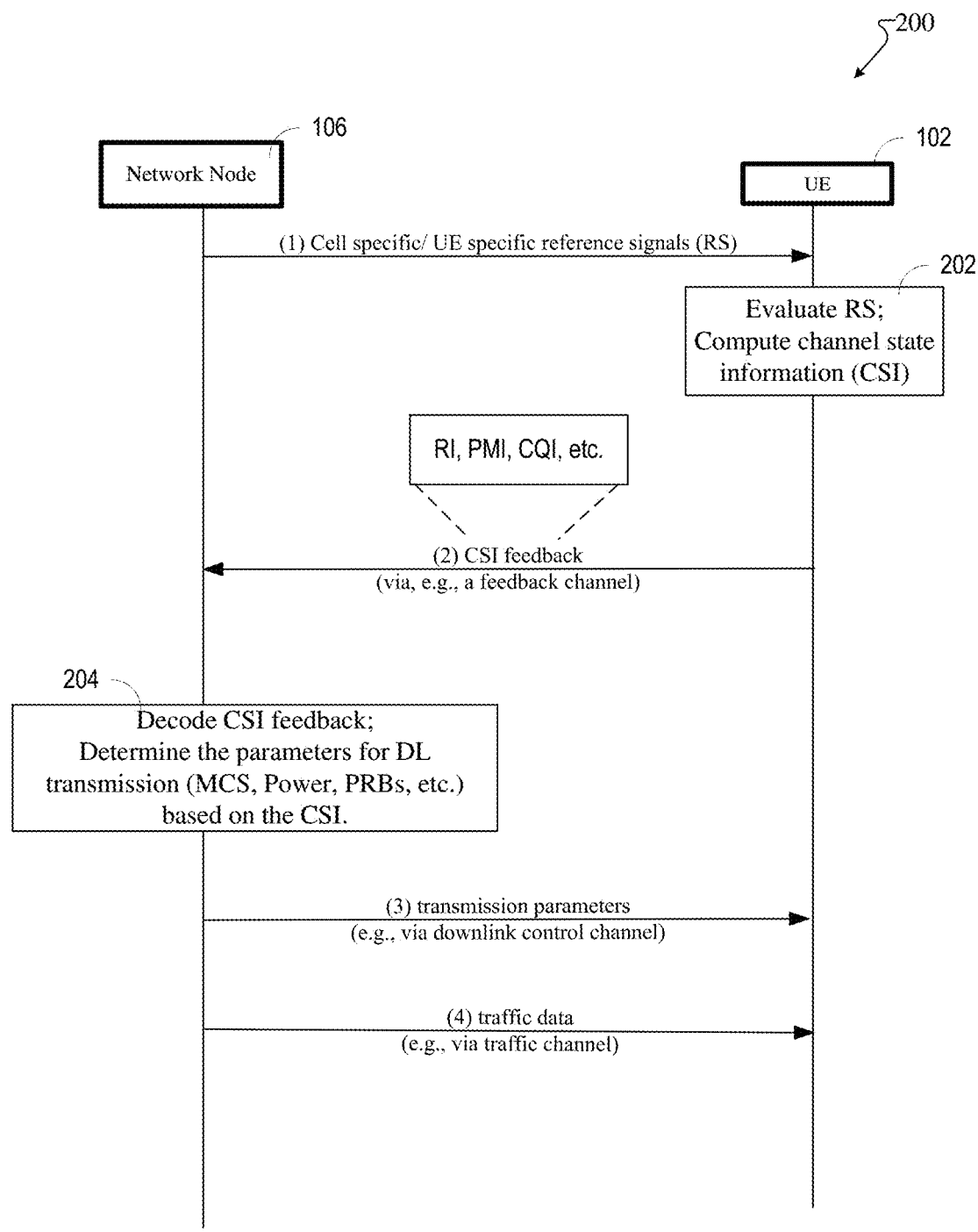
FIG. 2 illustrates an example schematic system block diagram of a UE in communication with a node device.

Referring now to FIG. 2, illustrated is an example schematic system block diagram of a UE in communication with a node device via a system 200. The system 200 comprises a network node (e.g., network node 106), can transmit a reference signal (RS) at transaction (1), which can be beam formed or non-beam formed, to a user equipment (e.g., UE 102). FIG. 2 illustrates a closed loop transaction diagram (e.g., sequence chart). Briefly described, in this technique, a reference signal is first sent from the network node to the UE. From the reference signals, the UE can compute the channel estimates and the parameters needed for channel state information (CSI) reporting. In LTE, the CSI report can comprise a channel quality indicator (CQI), preceding matrix index (PMI), rank information (RI), etc. The CSI report is sent to the network node via a feedback channel either on a periodic basis or on demand based CSI (e.g., aperiodic CSI reporting). The network node scheduler can use this information to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending on which value that a UE reports, the node can transmit data with different transport block sizes. If the node receives a high CQI value from the UE, then it can transmit data with larger transport block size, and vice versa.

[Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 106 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 106, as shown in block 204 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 104 can use the decoded CSI feedback to determine a suitable transmission protocol, which can comprise modulation and coding schemes (MCS) applicable to modulation and coding of the different transmissions between the network node 106 and the UE 102, power, physical resource blocks (PRBs), etc.

The network node 106 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network node 106 to the UE 102.

Figure 3:
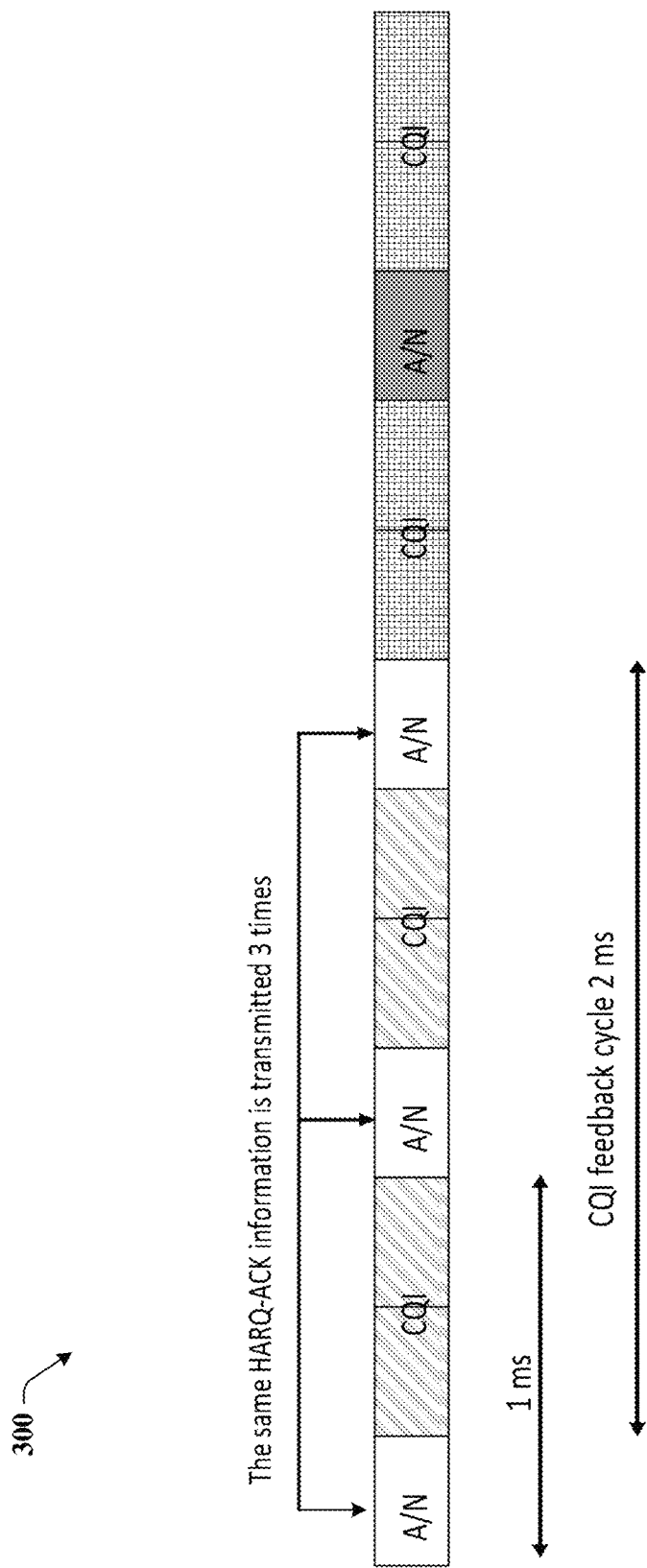
FIG. 3 illustrates an example schematic system block diagram of a hybrid automatic repeat request acknowledgement transmission using multi-slot physical uplink control channel transmissions.

Referring now to FIG. 3, illustrated is an example schematic system block diagram of a HARQ-ACK transmission using multi-slot physical uplink control channel transmissions. FIG. 3 depicts the CQI feedback cycle at 2 ms, the CQI repetition factor is 2, and the HARQ-ACK repetition factor is 3. Correct decoding of HARQ-ACK is primary component of 5G downlink PDSCH because the gNodeB needs to know whether the packet it transmitted is received correctly or not. As discussed above, the PUCCH can carry the information about HARQ-ACK. Once the gNodeB decodes the PUCCH data, the gNodeB can determine whether to re-transmit the packet (e.g., if is NAK) or pass it to upper layers (e.g., if it is ACK).

However, the PUCCH transmissions from several UEs can increase uplink interference levels (e.g., rise over thermal (RoT)) received in the uplink at the gNode B. This is because the UEs in uplink transmit use the same resources and the UEs are separated by non-orthogonal scrambling codes also called Zadoff-Chu (ZC) sequence. Therefore, uplink NR transmissions have to share interference limited radio resources. Reducing the interference in uplink frequencies can support increased and/or desired SIR levels on uplink transmission channels and maintain a stable system operation.

Figure 4:
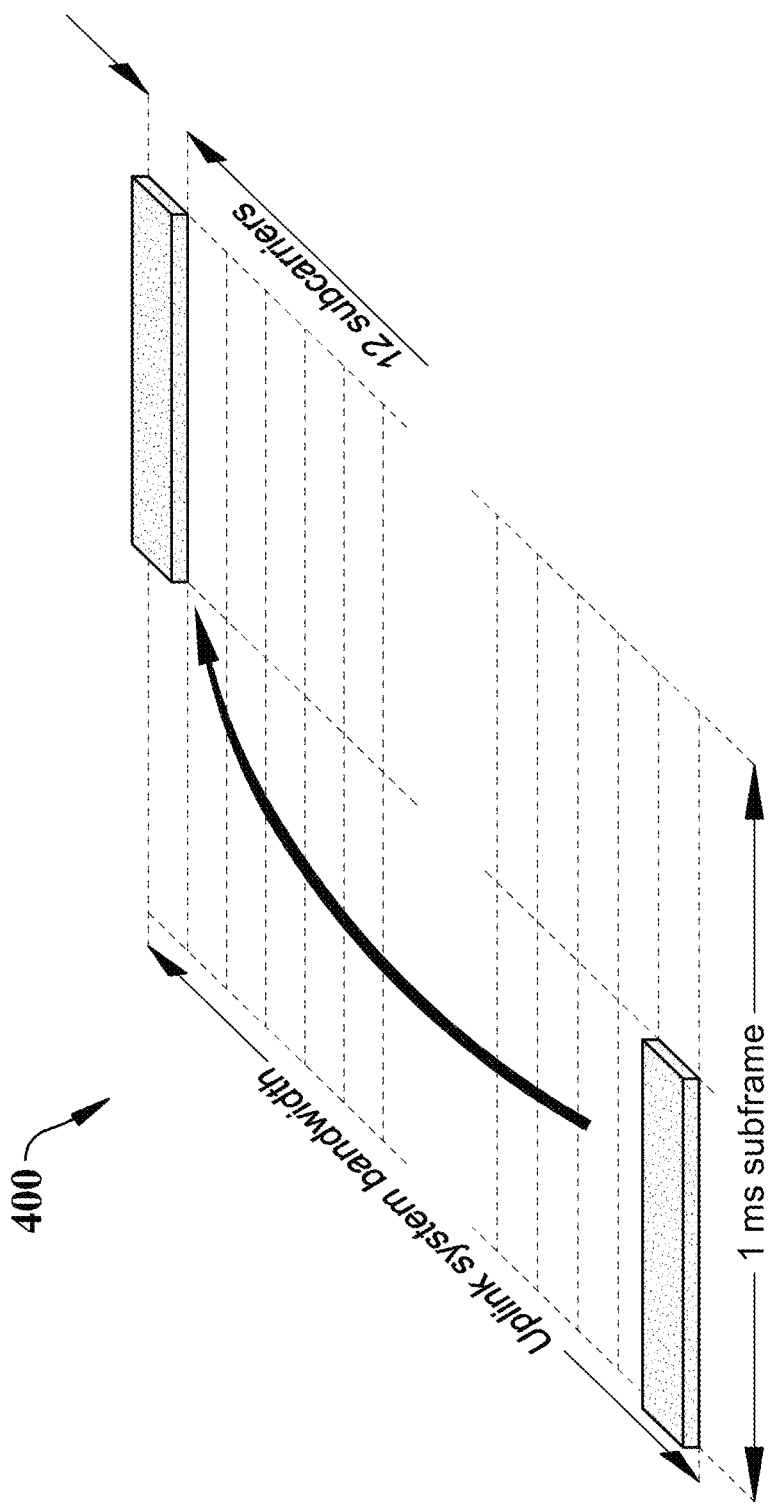
FIG. 4 illustrates an example schematic system block diagram of frequency hopping for a physical uplink control channel according to one or more embodiments.
Figure 5:
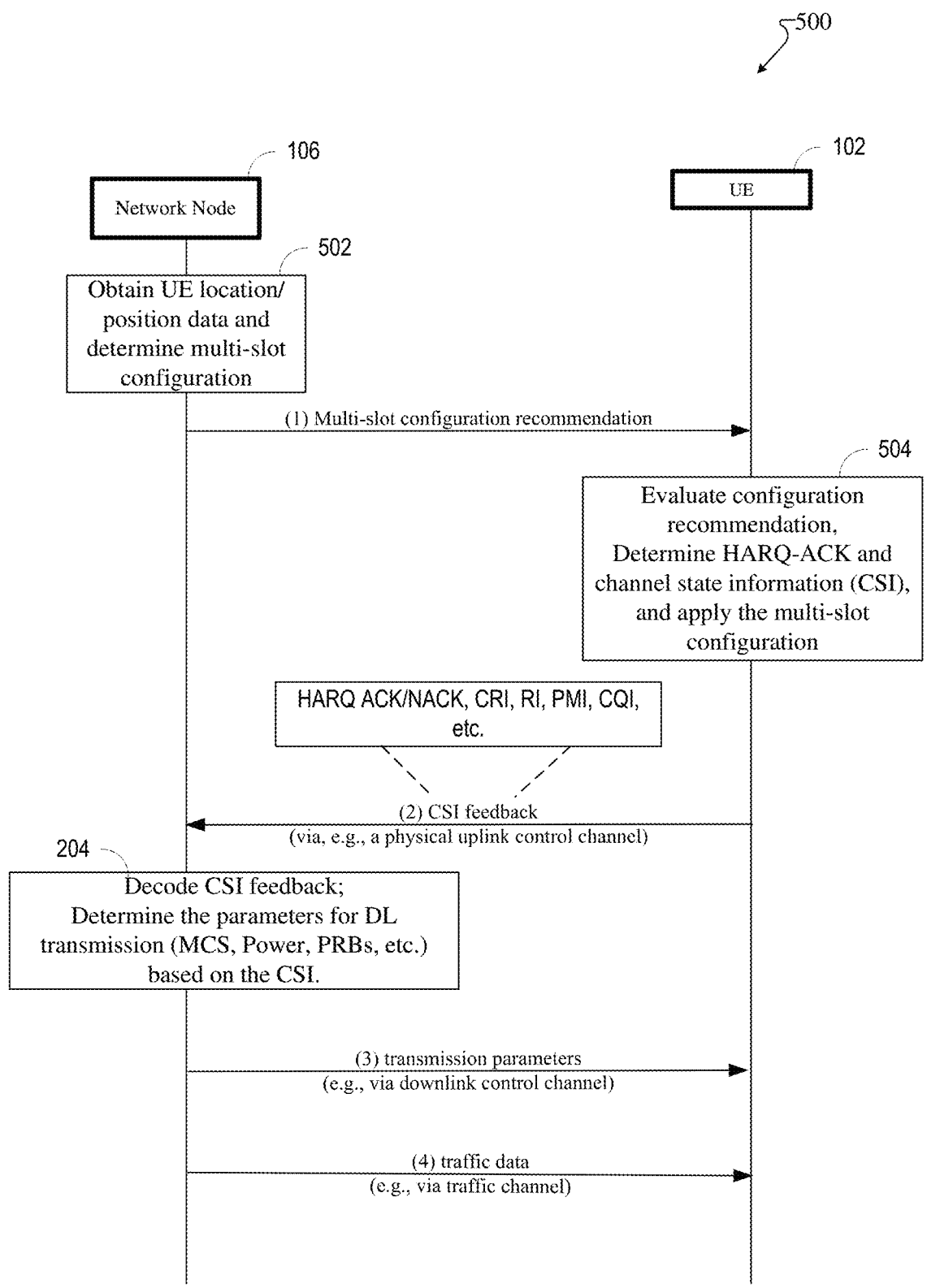
FIG. 5 illustrates an example schematic system block diagram of a UE in communication with a node device for determining a multi-slot operation according to one or more embodiments.

For the aforementioned reasons, the UE can repeat the information related to HARQ-ACK and CSI, during a multi slot transmission. FIG. 5 depicts an example of a multi slot PUCCH transmission, wherein the network configures a particular UE, based on the multi slot transmission, through higher layer signaling. These parameters can be signaled by the serving network to the UE via RRC signaling (e.g., higher layer) as depicted in FIG. 4. Thus, when the HARQ-ACK is repeated, the PUCCH performance is improved, thereby improving the PUCCH coverage.

Referring now to FIG. 4, illustrated is an example schematic system block diagram of frequency hopping chart 400 for a physical uplink control channel according to one or more embodiments. For reducing the inter cell interference, the resources allocated for PUCCH can be allocated far apart in a slot. FIG. 4 depicts an example of frequency hopping for PUCCH. It can be observed that during the first part of the transmission, the resources are allocated on the left side in bottom slot, while at the second part of the transmission the resources are allocated on the right side in a top slot of the uplink systems bandwidth. Hence with frequency hopping, PUCCH performance can be improved as frequency hopping increases frequency diversity.

Instead of transmitting only in uplink over all the OFDM symbols, frequency hopping can symmetrically partition the OFDM symbols in a first set (e.g., seven) of OFDM symbols which can be transmitted in one location, and a second set (e.g., seven) of OFDM symbols which can be transmitted in another location. However, the problem is that when UE 102 is configured for multi-slot or ACK NAK CSI, transmissions are repeated, but the hopping pattern is not known for frequency hopping. One way to mitigate this issue is to use the same frequency hopping for each multi-slot, but this creates no diversity gain. Thus, the dynamic hopping patterns for multi-slot operations can be based on certain conditions (e.g., location, GPS, Doppler metrics, etc.) for increased diversity gains.

Referring now to FIG. 5 illustrates an example schematic system block diagram of a UE in communication with a node device for determining a multi-slot operation according to one or more embodiments. The network node 106 can obtain location and/or position data at block 502 of the UE 102. For example, GPS, Doppler metrics, and/or other systems can be used to determine the location of the UE 102 in relation to the network node 106. Based on the location and/or position data of the UE 102, the network node 106 can determine a multi-slot configuration that can then be sent as a recommendation to the UE 102. The recommendation can also comprise a frequency hopping pattern for the slots associated with the UE 102. The UE 102 can be served by a first cell, which is served by the network node 106. Thus, the UE 102 can be configured by the network node 106 to transmit uplink feedback information. Examples of UL feedback information are CQI, HARQ ACK/NACK, PMI, RI, CRI etc. Based on the multi-slot configuration recommendation received from network node 106, the UE 102 can autonomously determine, or can further be configured by the network node 106, with at least a first repetition factor for the HARQ ACK/NACK based on one or more criteria. The value of K1 can be used by the UE 102 for repeating the same content of at least the uplink feedback information and transmitting the repeated content to the network node 106. Thus, at block 504, the UE 102 can evaluate the multi-slot configuration recommendation, determine HARQ ACK and CSI information, and apply the multi-slot configuration and the frequency hopping pattern for the slots to uplink transmissions.

Repetition of the same uplink feedback signal can enhance the reliability of the reception of the feedback at the network node 106. The terms "repetition factor" (a.k.a., a redundancy factor, a redundancy version) can be associated with the terms "repeated content" (a.k.a., redundancy content). The transmission of the repeated contents can be sent in the same message, transmission occasion, instance, or over multiple messages, channel transmission occasions, or instances. In some embodiments, the same value of K1 can be used for transmitting the repeated contents of a plurality of uplink feedback information (e.g., same for transmitting CQI, HARQ ACK/NACK, etc.). However, in some embodiments, different values of K1 can be used for transmitting the repeated contents of different types of uplink feedback information (e.g., K1=2 and K1=4, for transmitting CQI and transmitting HARQ ACK/NACK, respectively).

Figure 6A:
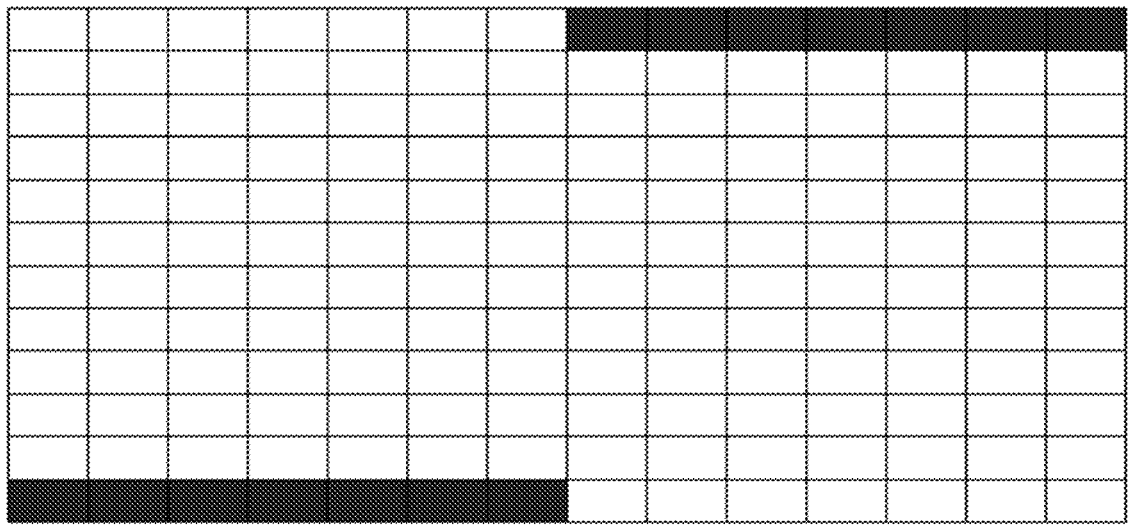
FIGS. 6A, 6B, 7A, and 7B illustrate an example schematic system block diagram of predefined frequency hopping configurations according to one or more embodiments.
Figure 6B:
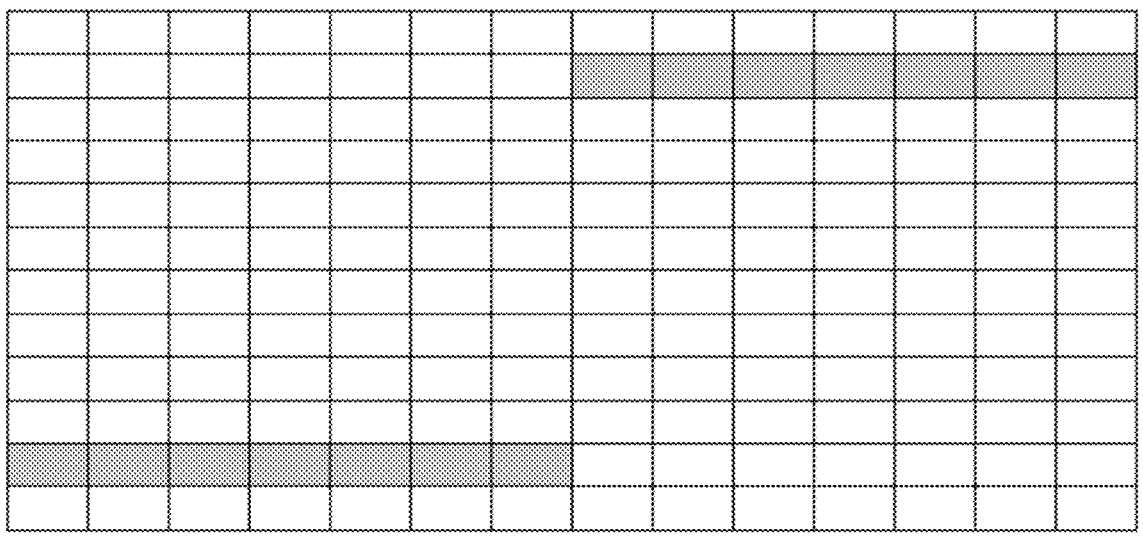
Figure 7A:
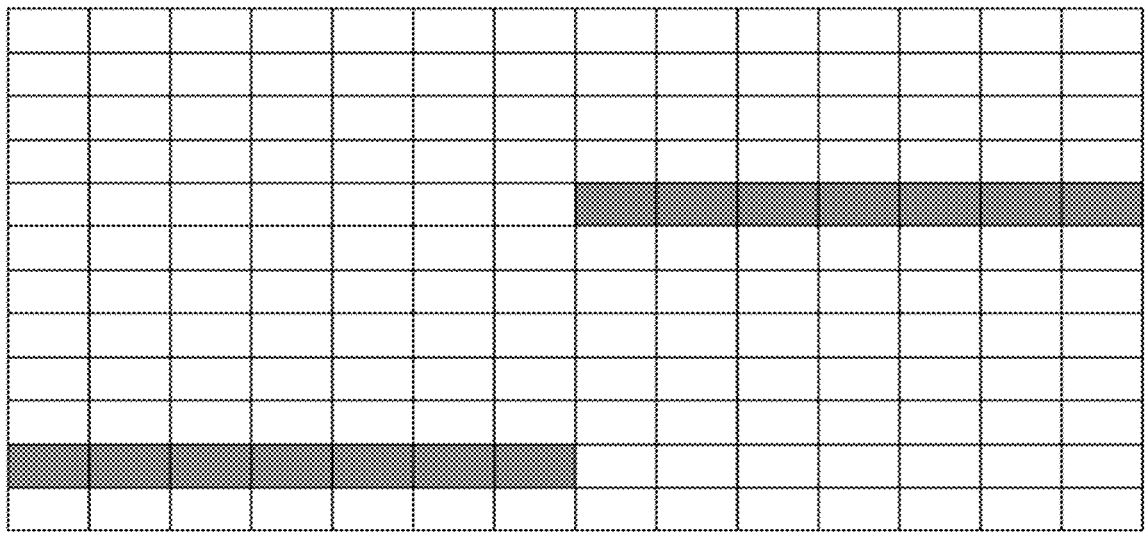
Figure 7B:
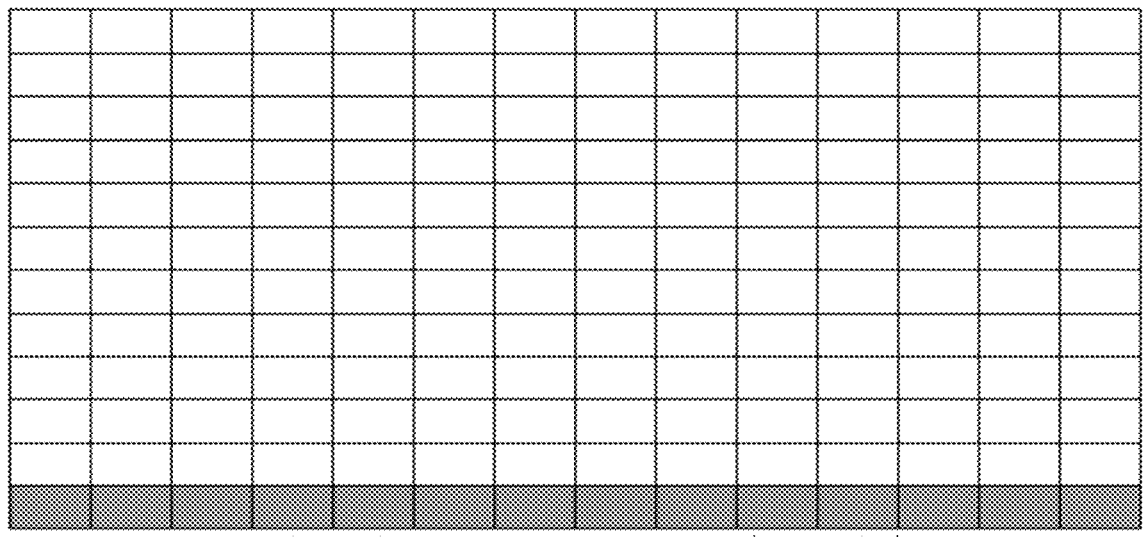

Referring now to FIGS. 6A, 6B, 7A and 7B, illustrated is an example schematic system block diagram of predefined frequency hopping configurations according to one or more embodiments. When the UE 102 is configured with multiple slots, different frequency hopping patterns can be applied to different slots, to transmit the uplink control information (e.g., HARQ-ACK, CSI, etc.) The network node 106 and the UE 102 can pre-define frequency hopping configurations a priori. Therefore, the frequency hopping patterns can be known by both the network node 106 and the UE 102. Thus, the network node 106 can inform the UE 102 on what hopping pattern it should choose for each slot. For example, the network node 106 and the UE 102 a priori knows the frequency hopping patterns in FIGS. 6A, 6B, 7A and a no hopping pattern as depicted 7B. For example, FIG. 6A depicts a first frequency hopping pattern, FIG. 6B depicts a second frequency hopping pattern, FIG. 7A depicts a third frequency hopping pattern, and FIG. 7B depicts a no hopping pattern.

Figure 8:
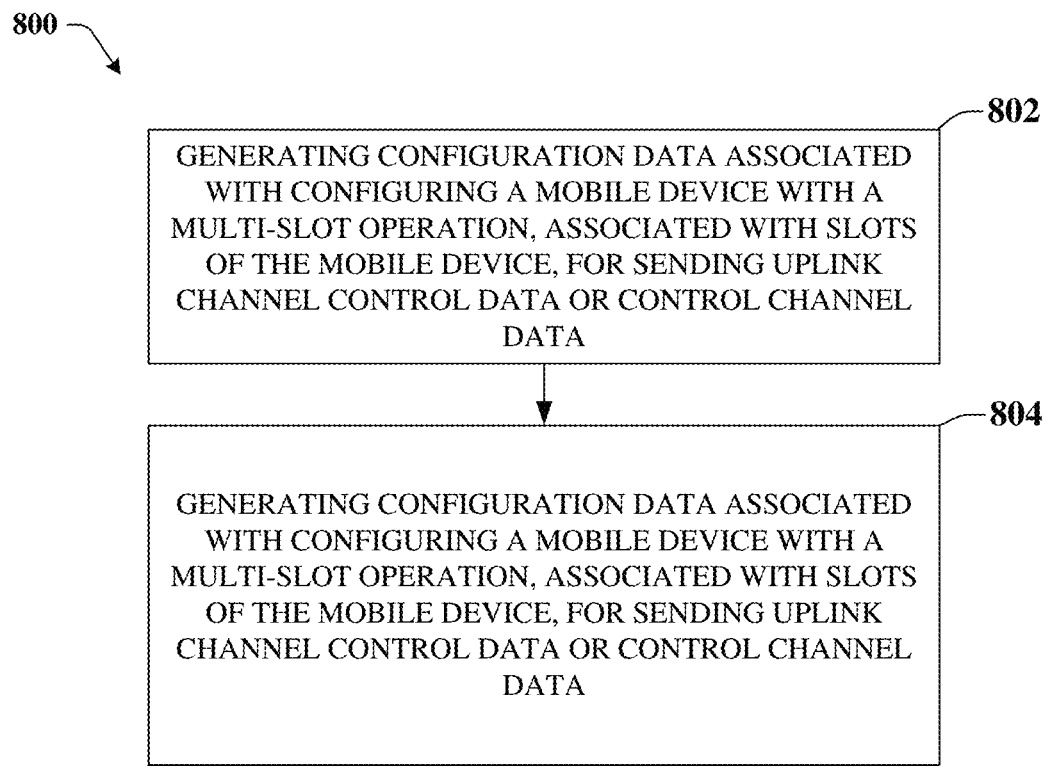
FIG. 8 illustrates an example flow diagram of a system for multi-slot frequency hopping.

Referring now to FIG. 8, illustrated is an example flow diagram of a system 800 for multi-slot frequency hopping. At element 802, the operations can comprise generating (e.g., via the network node 106) configuration data associated with configuring a mobile device 102 with a multi-slot operation, associated with slots of the mobile device 102, for sending uplink channel control data or traffic channel data. Additionally, at element 804, the operations can comprise transmitting (e.g., via the network node 106) the configuration data to the mobile device 102, resulting in a multi-slot configuration of the mobile device 102, wherein the configuration data comprises hopping patterns to be used by the slots.

Figure 9:
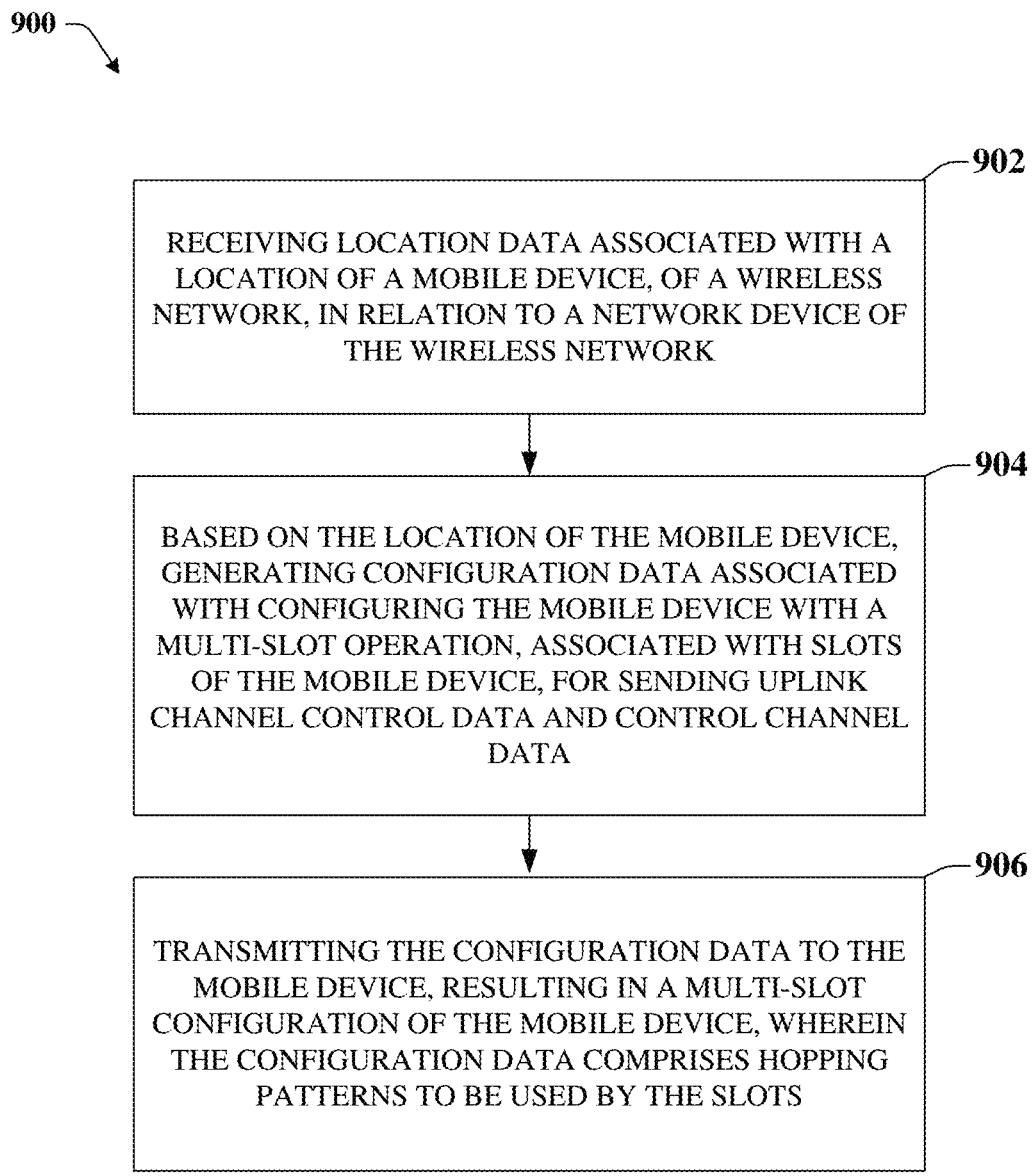
FIG. 9 illustrates an example flow diagram of a machine-readable medium for multi-slot frequency hopping.

Referring now to FIG. 9, illustrated is an example flow diagram of a machine-readable medium 900 for multi-slot frequency hopping. At element 902, the machine-readable medium operations can comprise receiving location data associated with a location of a mobile device 102, of a wireless network, in relation to a network device (e.g., via the network node 106) of the wireless network. Based on the location of the mobile device 102, the machine-readable medium can operations can comprise generating (e.g., via the network node 106) configuration data associated with configuring the mobile device 102 with a multi-slot operation, associated with slots of the mobile device 102, for sending uplink channel control data and control channel data at element 904. Furthermore, at element 906 the machine-readable medium can operations can comprise transmitting (e.g., via the network node 106) the configuration data to the mobile device 102, resulting in a multi-slot configuration of the mobile device 102, wherein the configuration data comprises hopping patterns to be used by the slots.

Figure 10:
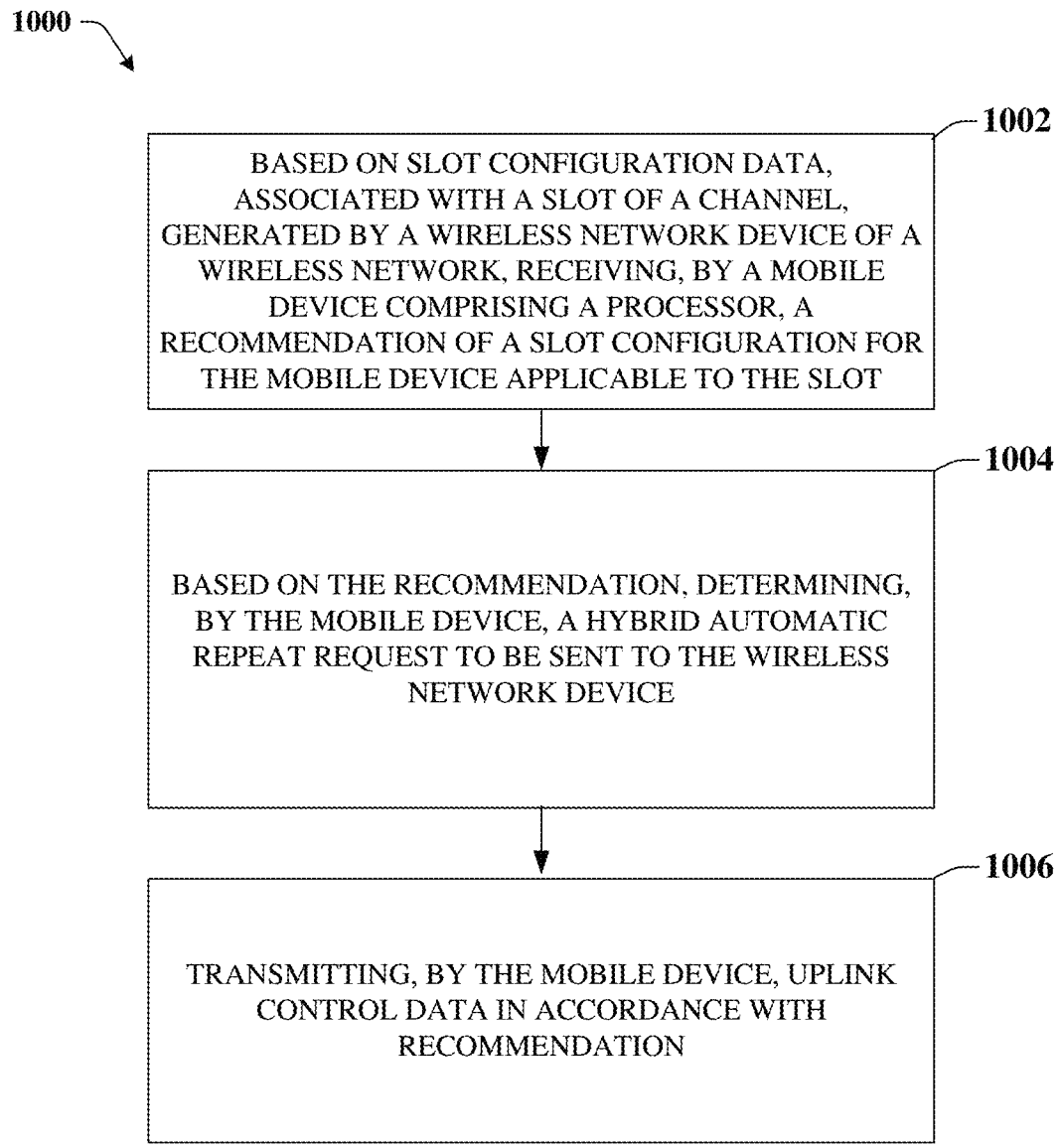
FIG. 10 illustrates an example flow diagram of a method for multi-slot frequency hopping.

Referring now to FIG. 10, illustrated is an example flow diagram of a method 1000 for multi-slot frequency hopping. At element 1002, the method can comprise receiving, by a mobile device 102 comprising a processor, a recommendation of a slot configuration for the mobile device 102 applicable to the slot based on slot configuration data, associated with a slot of a channel, generated by a wireless network device (e.g., the network node 106) of a wireless network. Additionally, the method can comprise determining, by the mobile device 102, a hybrid automatic repeat request to be sent to the wireless network device (e.g., the network node 106) based on the recommendation at element 1004. Furthermore, the method can comprise transmitting, by the mobile device 102, uplink channel control data in accordance with recommendation at element 1006.

Figure 11:
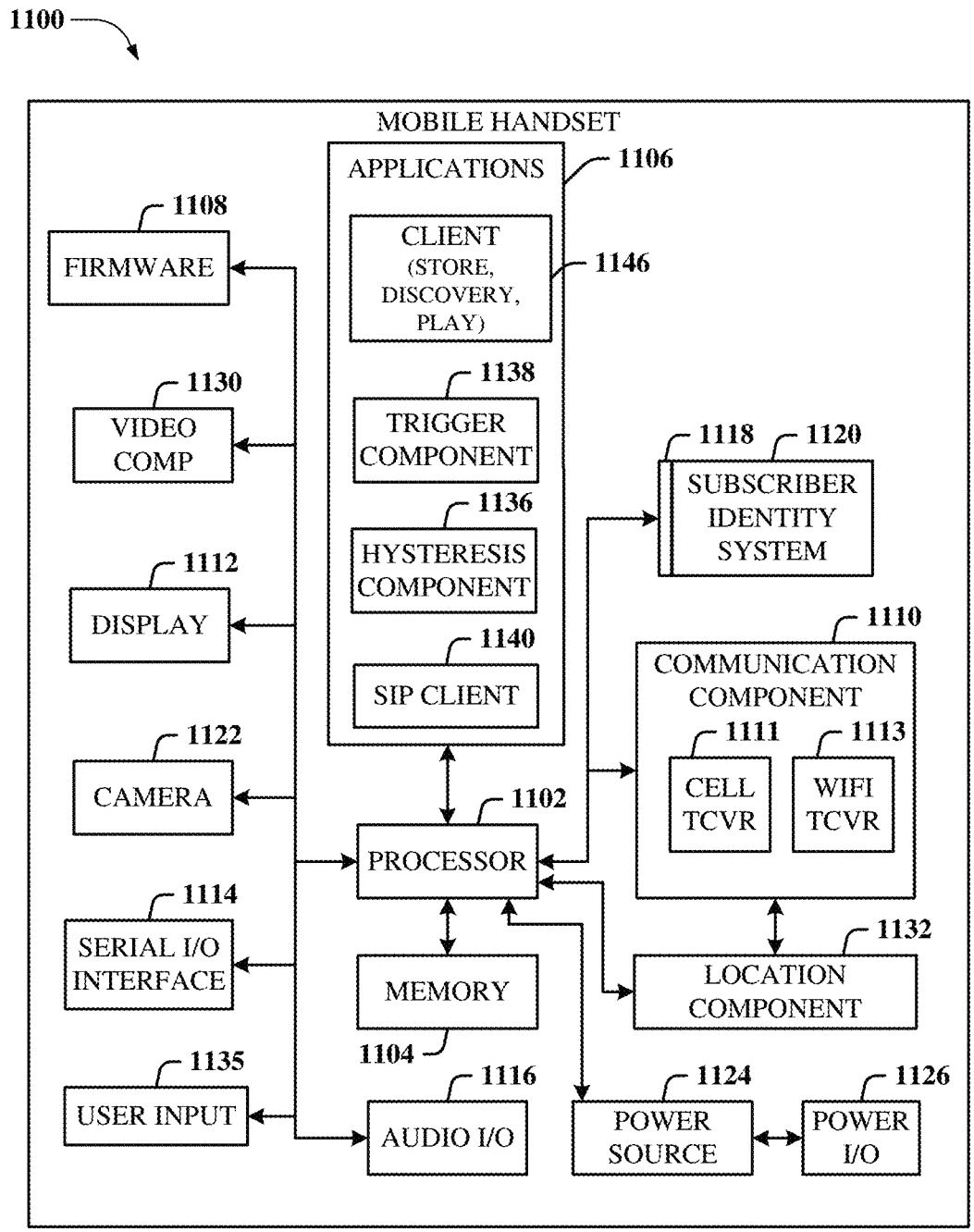
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
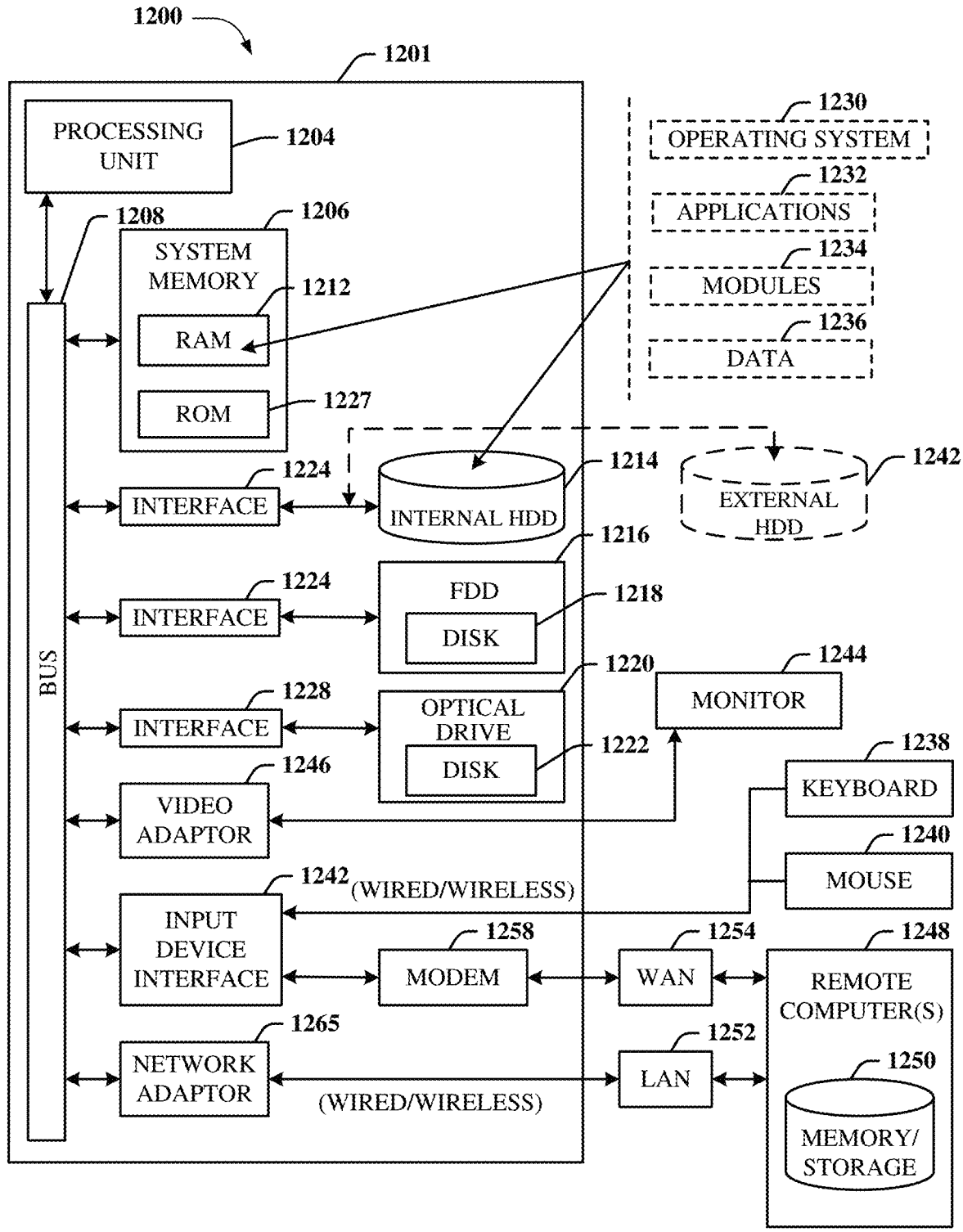
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

To improve the coverage of PUCCH, the network can configure a UE with multi slot operation. Frequency hopping provides additional frequency diversity gains. However, when the network configures a UE with frequency hopping in combination with a multi-slot operation the full diversity gains may not be obtained. This is because the hopping is done at the slot level (e.g., in multi slot operation, each slot has the same frequency hopping pattern as that of the first slot). Hence, over all the multi slots, the frequency diversity gain is equal to that of the first slot. This in turn reduces the coverage for NR. Thus, an efficient solution can obtain diversity gains when the UE is configured with multi slot operation in NR.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   generating configuration data associated with configuring a user equipment with a multi-slot operation, associated with slots of the user equipment, for sending uplink channel control data or traffic channel data;
   based on global positioning system data associated with the user equipment, determining the hopping patterns to be used by the user equipment;
   transmitting the configuration data to the user equipment, resulting in a multi-slot configuration of the user equipment, wherein the configuration data comprises hopping patterns to be used by the slots; and
   generating flag data associated with a flag indicative of a determination to use a same hopping pattern of the hopping patterns for the slots or a different hopping pattern of the hopping patterns for the slots.

2. The system of claim 1, wherein the configuration data comprises hopping patterns to be used by the slots.

3. The system of claim 1, wherein the operations further comprise:
   determining a signal-to-noise ratio associated with a channel utilized for a communication between the user equipment and network equipment.

4. The system of claim 1, wherein transmitting of the configuration data comprises transmitting the configuration data via a radio resource control signal.

5. The system of claim 1, wherein transmitting of the configuration data comprises transmitting the configuration data via a physical layer signal.

6. The system of claim 1, wherein the operations further comprise:
   configuring the user equipment with a hopping pattern, wherein the hopping pattern is a defined hopping pattern, for the multi-slot operation.

7. The system of claim 1, wherein the operations further comprise:
   sending configuration data associated with the multi-slot configuration to the user equipment.

8. A non-transitory machine-readable medium, comprising executable instructions that, when executed by a processor, facilitate performance of operations, comprising:
   receiving location data associated with a location of a user equipment in relation to network equipment;
   based on the location of the user equipment, generating configuration data associated with configuring the user equipment with a multi-slot operation, associated with slots of the user equipment, for sending uplink channel control data and control channel data;

based on global positioning system data associated with the user equipment, determining the hopping patterns to be used by the user equipment;

transmitting the configuration data to the user equipment, resulting in a multi-slot configuration of the user equipment, wherein the configuration data comprises hopping patterns to be used by the slots; and generating flag data associated with a flag indicative of a determination to use a hopping pattern of the hopping patterns for the slots or a different hopping pattern of the hopping patterns for the slots.

9. The non-transitory machine-readable medium of claim 8, wherein the operations further comprise:

determining a signal-to-noise ratio associated with a channel utilized for communication between the user equipment and the network equipment.

10. The non-transitory machine-readable medium of claim 8, wherein the configuration data comprises hopping patterns to be used by the slots.

11. The non-transitory machine-readable medium of claim 8, wherein the operations further comprise:

determining a frequency hopping pattern, for the slots, to be utilized by the user equipment.

12. The non-transitory machine-readable medium of claim 8, wherein transmitting of the configuration data comprises transmitting the configuration data via a radio resource control signal.

13. The non-transitory machine-readable medium of claim 12, wherein the configuration data comprises constraint data representative of a number of times that the user equipment is to repeat a transmission of a hybrid automatic repeat request acknowledgment.

14. The non-transitory machine-readable medium of claim 12, wherein the configuration data comprises hopping patterns that are representative of frequency hopping patterns to be associated with the slots.

15. A method, comprising:

based on slot configuration data, associated with a slot of a channel, generated by network equipment, receiving, by a mobile device comprising a processor, a recommendation of a slot configuration for the mobile device applicable to the slot;

based on the recommendation, determining, by the mobile device, a hybrid automatic repeat request to be sent to the network equipment;

based on global positioning system data associated with the mobile device, determining hopping patterns to be used by the mobile device;

facilitating, by the mobile device, transmitting uplink channel control data in accordance with the recommendation, wherein the configuration data comprises hopping patterns to be used by the slot; and generating flag data associated with a flag indicative of a determination to use a same hopping pattern of the hopping patterns for the slots or a different hopping pattern of the hopping patterns for the slot.

16. The method of claim 15, wherein the slot configuration data is determined based on a path loss associated with data being transmitted from the mobile device.

17. The method of claim 15, wherein the recommendation comprises a frequency hopping pattern recommendation associated with a group of slots.

18. The method of claim 15, wherein the slot configuration data is determined based on a location associated with the mobile device.

19. The method of claim 15, further comprising:

determining, by the mobile device, a hopping pattern, associated with the configuration data, to be used by the slot.

20. The method of claim 15, wherein the slot configuration data is based on a value of the Doppler metric representative of a speed of the mobile device.

* * * * *